United States Patent [19]

Kozma

[11] Patent Number: 5,053,438

[45] Date of Patent: Oct. 1, 1991

[54] FOAM MATERIAL

[75] Inventor: Matthew L. Kozma, Osterville, Mass.

[73] Assignee: Packaging Industries Group, Inc., Hyannis, Mass.

[21] Appl. No.: 479,601

[22] Filed: Feb. 13, 1990

Related U.S. Application Data

[63] Continuation of Ser. No. 361,761, Jun. 5, 1989, Pat. No. 4,900,490, which is a continuation of Ser. No. 51,141, May 15, 1987, abandoned.

[51] Int. Cl.$^5$ ................................................. C08J 9/10
[52] U.S. Cl. ...................................... 521/134; 264/54; 264/232; 264/320; 264/DIG. 5; 264/18; 521/81; 521/140
[58] Field of Search .................... 521/134, 140, 81; 264/54, 232, 320, DIG. 5, DIG. 18

[56] References Cited

U.S. PATENT DOCUMENTS

| | | | |
|---|---|---|---|
| 3,709,806 | 1/1973 | Minami | 521/134 |
| 3,965,054 | 6/1976 | Nojiri | 521/134 |
| 4,203,815 | 5/1980 | Noda | 521/134 |
| 4,212,787 | 7/1980 | Matsuda | 521/134 |
| 4,247,652 | 1/1981 | Matsuda | 521/134 |
| 4,384,032 | 5/1983 | Tashiro | 521/134 |
| 4,387,169 | 6/1983 | Zabrocki | 521/134 |
| 4,421,867 | 12/1983 | Nojiri | 521/134 |
| 4,446,254 | 5/1984 | Nakae | 521/134 |
| 4,581,383 | 4/1986 | Park | 521/134 |
| 4,680,317 | 7/1987 | Kuhnel et al. | 521/140 |
| 4,719,039 | 1/1988 | Leonardi | 521/134 |
| 4,738,810 | 4/1988 | Cheng-Shiang | 521/134 |
| 5,510,031 | 4/1985 | Matsumura | 521/134 |

*Primary Examiner*—Morton Foelak
*Attorney, Agent, or Firm*—Dickinson, Wright

[57] ABSTRACT

A foam material, particularly suitable for use as a midsole material for an athletic shoe, comprises polyethylene modified by an elastomer modifier and cross-linked, preferably using a peroxide cross-linking agent, to form a closed cell foam material which has superior strength properties, improved energy return and reduced sensitivity to temperature change.

8 Claims, No Drawings

FOAM MATERIAL

RELATED APPLICATIONS

This application is a continuation of Ser. No. 361,761, filed June 5, 1989, now U.S. Pat. No. 4,900,490, which is a continuation of Ser. No. 051,141 filed May 15, 1987, abandoned.

FIELD OF THE INVENTION

The invention relates to foam material particularly useful for midsole material used in athletic shoes.

BACKGROUND OF THE INVENTION

Athletic shoes have an outer sole designed to maintain traction and a midsole to both cushion the foot and control the gait. Midsole material must be carefully formulated since cushioning often comes at the expense of control, and vice-versa. A midsole engineered to control motion may often include two or three different densities of foam material. Ethylene vinyl acetate (EVA) and/or the more expensive polyurethane are often used, and may be used in the same midsole, with the firmer, heavier densities concentrated in the areas bearing the greatest impact (the heel, inner side of the mid-foot, and under the ball of the foot). A heel wedge may be incorporated into the midsole.

Other materials previously used for midsole material of athletic shoes include ethylene propylene diene monomer (used alone), styrene-butadiene rubber and neoprene.

SUMMARY OF THE INVENTION

A new improved foam midsole material comprises polyethylene modified by an elastomer. A preferred elastomer for use as a modifier is ethylene propylene diene monomer (EPDM). The elastomer is used as a modifier for a polyethylene material comprising at least one member selected from, for example, low density polyethylene, linear low density polyethylene, ultra low density polyethylene and high density polyethylene. Use of an elastomer modified polyethylene enhances the properties of a midsole molded from such material. The material may also be used for molding an outer sole.

An object of the invention is to provide a novel foam material.

Another object of the invention is to provide a novel foam material for use as a midsole material for an athletic shoe.

Yet another object of the invention is to provide a novel foam material for use as an outer sole material for an athletic shoe.

DETAILED DESCRIPTION OF THE INVENTION

Shoe sole material must have good rebound qualities and high tensile strength. The midsole is the working part of the shoe and must be shock resistant to provide comfort since the midsole absorbs the impact of use. The outer sole is generally molded to include traction elements and the material used must be abrasion resistant to provide good wearing qualities. The inner sole of an athletic shoe provides foot comfort.

The foam material of the invention may be used either for the midsole or for the outer sole or for both the midsole and the outer sole. The soles may be produced by compression molding or by injection molding or the foam material may be formed into a sheet and then cut to shape Other methods will be apparent to one skilled in the art.

A foam material of the invention for use, for example, in soling compound for athletic shoes comprises polyethylene modified by an elastomer. Use of an elastomer to modify polyethylene used in midsole material for athletic shoes enhances the properties of the midsole, particularly providing improved energy return and reduced sensitivity to temperature change compared with prior art materials such as elastomer used alone or EVA.

The foam material comprises polyethylene modified by an elastomer and cross-linked to form a closed cell foam material. The elastomer modifier is preferably ethylene propylene diene monomer (EPDM) and the polyethylene is, for example, at least one member selected from the group consisting of low density polyethylene, linear low density polyethylene, ultra low density polyethylene and high density polyethylene.

Cross-linking may be carried out in a number of known ways, for example, using peroxide, radiation curing, silane cross-linking, or other known methods. Peroxide cross-linking is the preferred method.

The following example demonstrates an advantageous material of the invention providing improved energy return, resistance to compression set and resistance to abrasion, and reduced sensitivity of performance characteristics to temperature change than elastomer alone, EVA or other prior art compounds.

EXAMPLE 1

The following formulation was used to provide a foam material of the invention:

|  | Parts per Hundred |
| --- | --- |
| EPDM (NORDEL No. 1440) | 100.0 |
| Low density polyethylene (NORCHEM LDPE 553) | 100.0 |
| Blowing agent (KEMPORE 60/14 ff) | 10.0 |
| Activator (zinc stearate) | 5.0 |
| Cross-linking agent (LUPERCO 500 - 40 KE) | 4.0 |

The blowing agent (KEMPORE 60/14 ff) is azodicarbonamide, the cross-linking agent (LUPERCO 500 - 40 KE) is dicumyl peroxide. Examples of other compounds useful in the invention include:

Elastomer EPDM, styrene-butadiene rubber (SBR), neoprene, nitrile, acrylic, etc.

Polyethylene: low density polyethylene (LDPE), linear LDPE, ultra LDPE, high density polyethylene, etc.

Blowing agent: azodicarbonamide, dinitroso-pentamethylene tetramine (DNPT), 4, 4' oxybis (benzenesulfonyl) hydrazine (OBSH), etc.

Activator: Zinc stearate, zinc oxide, etc.

Cross-linking agent: dicumyl peroxide, di-tertiarybutyl peroxide, silane, methacrylate coupling agents, etc.

Pigments and fillers may optionally be included. Extenders, such as oils or plasticizers may also be used.

A typical production process for manufacturing a material of Example 1 of the invention comprises fusion mixing EPDM and low density polyethylene (LDPE) in a dispersion mixer for 15–20 minutes at 320° F., and then sheeting or pelletizing and cooling the material to about 280° F. The remaining ingredients, shown in Example 1, are added (in the stated proportions) to the EPDM/LDPE fused mixture, mixed in a dispersion mixer at about 280° F., and passed through a roll mill for sheeting. The sheets are cooled, cut, and press molded in a hydraulic press for 30 minutes at 340° F. to produce a midsole pad which is then cured and expanded as known in the art.

Test samples were cured for thirty minutes at 340° F. (without oven normalization), molded in a 6 in.×6 in.×½ in. mold, and tested. Results showed that, with a density lower than ethylene vinyl acetate (EVA), energy return properties are better than EVA, and the material has 25% less sensitivity to changes in temperature than EVA. The density of the material is about 7 to 10 lb./cu. ft. Tear resistance is about 18 to 22 lb./in.

The combination of properties which determine improved energy return and reduced sensitivity of energy return to temperature change are dependent on the tensile strength and elongation of the material. Increased tensile strength is balanced against reduction in elongation in determining the optimum combination providing improved energy return. The density of the material may be varied according to the amount of blowing agent used.

In alternative formulations, the blowing agent may be incorporated with the polyethylene and such a formulation (for example, NORTECK 1150) may be used in place of at least part of the LDPE and/or blowing agent used in the formulation of the foam. Moreover, the LDPE (NORCHEM) fused with the EPDM (NORDEL) may constitute only part of the total LPPE. Other examples of formulations of the invention are as follows:

|  | Example | | | | | |
|---|---|---|---|---|---|---|
|  | 1 | 2 | 3 | 4 | 5 | 6 |
| *EPDM (NORDEL 1440) | 100 | 100 | 100 | 100 | 100 | 100 |
| *LDPE (NORCHEM 553) | 100 | 100 | 100 | 25 | 100 | 100 |
| LDPE (NORCHEM 553) | — | 100 | 25 | — | 60 | — |
| Blowing agent (KEMPORE 60/14 ff) | 10 | 15 | — | — | 15 | — |
| Zinc stearate | 5 | 7.5 | 7.5 | 5 | 6.5 | 6.5 |
| LUPERCO 500 40 KE | 4 | 6 | 6 | 4 | 5.2 | 5.2 |
| NORTECK 1150 (20% blowing agent) | — | — | 75 | 75 | — | 75 |

*fused for 30 minutes at 340° F.

Table I shows test results for cross-linked foams of Example 1 of the invention. Specimens A, B and C differ only by the LDPE used. Specimen A is NORCHEM 953, specimen B is NORCHEM 963 and specimen C is NORCHEM 553. Other similar formulations will be apparent to one skilled in the art.

Comparative results with EPDM used alone, in a prior art formulation are as follows:

|  | Parts Per Hundred |
|---|---|
| EPDM (ROYALENE 521) | 80.0 |
| EPDM (ROYALENE 512) | 20.0 |
| Stearic Acid | 2.0 |
| Zinc Oxide | 5.0 |
| Carbowax 4000 | 3.0 |
| N672, SRF Black | 15.0 |
| Suprex Clay | 175.0 |
| Sunpar 150 | 55.0 |
| BIK-OT ® | 2.0 |
| CELOGEN ® AZ 130 | 8.0 |
| MBTS ® | .5 |
| Sulfur | 2.0 |
|  | 367.5 |

TABLE I

TEST RESULTS: CROSS-LINKED FOAM

| SPECIMEN | DENSITY: | | |
|---|---|---|---|
|  | WEIGHT (grams) | SAMPLE SIZE (in.) | DENSITY (lbs./ft.$^3$) |
| A | 4.59 | .551 × 2.003 × 2.026 | 7.82 |
| B | 4.48 | .526 × 1.988 × 2.018 | 8.09 |
| C | 4.93 | .513 × 1.993 × 2.019 | 9.10 |

| COMPRESSION DEFLECTION: (Crosshead 2 in./min.) | | | |
|---|---|---|---|
| SPECIMEN | ACTUAL SIZE (in.) | LOAD (lbs.) | COMPRESSION DEFLECTION lbs./in.$^2$ @ 25% DEF. |
| A1 | .551 × 2.003 × 2.026 | 110 | 27.1 |
| A2 | .551 × 1.995 × 2.029 | 118 | 29.2 |
| A3 | .536 × 2.021 × 2.012 | 114 | 28.0 |
|  |  |  | AVG. 28.1 |
| B1 | .526 × 1.988 × 2.018 | 114 | 28.4 |
| B2 | .526 × 1.989 × 2.011 | 116 | 29.0 |
| B3 | .536 × 1.978 × 2.016 | 122 | 30.6 |
|  |  |  | AVG. 29.3 |
| C1 | .531 × 1.993 × 2.019 | 89 | 22.1 |
| C2 | .505 × 2.028 × 1.979 | 84 | 20.9 |
| C3 | .502 × 2.026 × 1.969 | 84 | 21.1 |
|  |  |  | AVG. 21.4 |

| TEAR RESISTANCE: (Crosshead 20 in./min.) | | | |
|---|---|---|---|
| SPECIMEN | THICKNESS (in.) | LOAD (lbs.) | TEAR (lbs./in.) |
| A1 | .487 | 10.4 | 21.4 |
| A2 | .482 | 10.0 | 20.7 |
| A3 | .495 | 10.0 | 20.2 |
|  |  |  | AVG. 20.8 |
| B1 | .496 | 10.4 | 21.0 |
| B2 | .501 | 10.0 | 20.0 |
| B3 | .485 | 8.4 | 17.3 |
|  |  |  | AVG. 19.4 |
| C1 | .497 | 11.1 | 22.3 |
| C2 | .492 | 9.0 | 18.3 |

TABLE I-continued

TEST RESULTS: CROSS-LINKED FOAM

| | | | |
|---|---|---|---|
| C3 | .507 | 10.3 | 20.3 |
| | | | AVG. 20.3 |

TENSILE STRENGTH AND ELONGATION: (Crosshead 20 in./min.)

| SPECIMEN | WIDTH (in.) | THICKNESS (in.) | ULT. LOAD (lbs.) | TENSILE STRENGTH (lbs./in.$^2$) | % ELONGATION |
|---|---|---|---|---|---|
| A1 | .460 | .493 | 42 | 185 | 175 |
| A2 | .465 | .529 | 40 | 163 | 144 |
| A3 | .460 | .518 | 44 | 185 | 150 |
| | | | | AVG. 178 | 156 |
| B1 | .463 | .531 | 46 | 187 | 188 |
| B2 | .460 | .495 | 41 | 180 | 175 |
| B3 | .463 | .523 | 43 | 178 | 150 |
| | | | | AVG. 182 | 171 |
| C1 | .467 | .487 | 40 | 176 | 150 |
| C2 | .464 | .495 | 40 | 174 | 150 |
| C3 | .465 | .486 | 41 | 181 | 138 |
| | | | | AVG. 177 | 146 |

COMPRESSION SET: 50% Def. for 22 hrs.   24 hrs. Recovery   Values are % of Original Thickness

| SPECIMEN | ORIGINAL THICKNESS (in.) | ACTUAL % DEF. W/.25" STOPS | THICKNESS AFTER RECOVERY (in.) | % SET |
|---|---|---|---|---|
| A1 | .551 | 45.8 | .517 | 6.2 |
| A2 | .542 | 46.1 | .507 | 6.5 |
| A3 | .542 | 46.1 | .500 | 7.7 |
| B1 | .541 | 46.2 | .507 | 6.3 |
| B2 | .537 | 46.6 | .506 | 5.8 |
| B3 | .534 | 46.8 | .502 | 6.0 |
| C1 | .514 | 48.6 | .485 | 5.6 |
| C2 | .517 | 48.4 | .485 | 6.2 |
| C3 | .515 | 48.5 | .486 | 5.6 |

Curing conditions: press molded for 20 minutes at 320° F. for ¾" thickness and oven aged for 3 hours at 250° F. Test results for this product are as follows:

| | |
|---|---|
| ML-4 at 212° F. | 34 |
| Expanded Density, lbs./cu. ft. | 12.5 |
| Tensile strength (lbs./sq. in.) | 100 |
| Elongation, % | 280 |
| Water absorption, vacuum method, % | 1.5 |
| 25% Compression Deflection, (lbs./sq. in.) | 6.0 |

Comparing the properties of the compounds of Table I with the properties of EPDM alone (shown above), it is clear that the inventive compounds have substantially improved compression deflection and tensile strength and substantially reduced elongation when compared with EPDM used alone.

While the invention has been described above with respect to certain embodiments thereof, it will be appreciated that variations and modifications may be made without departing from the spirit and scope of the invention.

What is claimed is:

1. A foam material made by a process comprising:
   fusing a resin mixture comprising ethylene-propylene diene terpolymer, polyethylene and a chemically decomposing blowing agent in a dispersion mixer;
   sheeting the fused resin;
   cooling the sheet resin;
   press molding the sheet resin in a hydraulic press;
   curing the resin during the press molding step, and
   expanding the cured molded resin immediately on opening the press to form a foam material having a density of about 7 to 10 lb. cu. ft. and a tear resistance of about 18 to 22 lb./in.

2. A foam material according to claim 1 wherein the fusing step comprises fusing crosslinking agent with the resin.

3. A foam material according to claim 1 wherein said polyethylene comprises at least one member selected from the group consisting of low density polyethylene, linear low density polyethylene, ultra low density polyethylene and high density polyethylene.

4. A thermosetting foam material made by a process comprising:
   fusing a resin mixture comprising ethylene-propylene diene terpolymer, polyethylene and a chemically decomposing blowing agent in a dispersion mixer;
   sheeting the fused resin;
   cooling the sheet resin;
   press molding the sheet resin in a hydraulic press;
   curing the resin during the press molding step, and
   expanding the cured molded resin immediately on opening the press to form a foam material having a density of about 7 to 10 lb. cu. ft., a tear resistance of about 18 to 22 lb./in., a compression deflection at 25% deflection greater than 20 lb./sq. in., a tensile strength greater than 175 lb./sq. in. and an elongation greater than 150%, proving improved energy return and reduced sensitivity of energy return to temperature change compared with elastomer alone.

5. A foam material according to claim 4 wherein said polyethylene comprises at least one member selected from the group consisting of low density polyethylene, linear low density polyethylene, ultra low density polyethylene and high density polyethylene.

6. A thermosetting, closed cell crosslinked foam material comprising a fused mixture of ethylene-propylene diene terpolymer and polyethylene, wherein the foam material has a compression deflection at 25% greater than 20 lb./sq. in., a tensile strength greater than 175 lb./sq. in. and an elongation greater than 150%, providing improved energy return and reduced sensitivity of energy return to temperature change compared with elastomer alone.

7. A foam material according to claim 6 wherein the foam material has a density of about 7 to 10 lb./cu. ft. and a tear resistance of about 18 to 22 lb./in.

8. A foam material according to claim 6 wherein said polyethylene comprises at least one member selected from the group consisting of low density polyethylene, linear low density polyethylene, ultra low density polyethylene and high density polyethylene.

* * * * *